US011943399B2

(12) United States Patent
Kim et al.

(10) Patent No.: US 11,943,399 B2
(45) Date of Patent: Mar. 26, 2024

(54) ELECTRONIC DEVICE FOR PROVIDING VARIOUS FUNCTIONS THROUGH APPLICATION USING A CAMERA AND OPERATING METHOD THEREOF

(71) Applicant: Samsung Electronics Co., Ltd., Gyeonggi-do (KR)

(72) Inventors: Kyunghwa Kim, Gyeonggi-do (KR); Minhee Kang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/986,272

(22) Filed: Nov. 14, 2022

(65) Prior Publication Data
US 2023/0076093 A1 Mar. 9, 2023

Related U.S. Application Data

(63) Continuation of application No. 17/529,807, filed on Nov. 18, 2021, now Pat. No. 11,528,370, which is a
(Continued)

(30) Foreign Application Priority Data

Feb. 19, 2019 (KR) ........................ 10-2019-0018890

(51) Int. Cl.
H04N 1/00 (2006.01)
G06F 3/0488 (2022.01)
H04M 1/72403 (2021.01)

(52) U.S. Cl.
CPC ....... *H04N 1/00352* (2013.01); *G06F 3/0488* (2013.01); *H04M 1/72403* (2021.01);
(Continued)

(58) Field of Classification Search
CPC .... G06F 3/0488; G06F 1/1686; G06F 1/1694; G06F 3/0416; G06F 3/04817;
(Continued)

(56) References Cited

U.S. PATENT DOCUMENTS 6,763,148 B1 7/2004 Stemberg
6,771,396 B1 8/2004 Cheatle
(Continued)

FOREIGN PATENT DOCUMENTS

CN 1405726 3/2003
CN 1972368 5/2007
(Continued)

OTHER PUBLICATIONS

Youtube, How to use Scan & Sign on iPad—Document Signerl, Jul. 26, 2017, 14 pages (https://youtu.be/2698jtsLM-k).
(Continued)

*Primary Examiner* — Negussie Worku
(74) *Attorney, Agent, or Firm* — The Farrell Law Firm, P.C.

(57) ABSTRACT

A portable communication device including a camera; a touchscreen display; a memory storing a camera application; and a processor is provided. The processor is configured to display a user interface of the camera application, wherein the user interface comprises a preview image corresponding to an image being obtained via the camera; while the preview image is displayed in the user interface, determine an area of the preview image in which a text is included; and while the preview image is displayed in the user interface, display a first graphical object corresponding to a function related to the area including the text.

39 Claims, 21 Drawing Sheets

Related U.S. Application Data continuation of application No. 16/794,984, filed on Feb. 19, 2020, now Pat. No. 11,223,728.

(52) U.S. Cl.
CPC ..... *H04N 1/00018* (2013.01); *H04N 1/00244* (2013.01); *H04N 1/00411* (2013.01)

(58) Field of Classification Search
CPC ..... G06F 3/0482; B60R 25/252; B60R 25/34; G06V 40/1365; H04M 1/0264; H04M 2201/34; H04M 2201/38; H04M 2250/12; H04N 23/62; H04N 23/631; H04N 23/64
USPC .......................................................... 358/505
See application file for complete search history.

(56) References Cited

U.S. PATENT DOCUMENTS

| | | | |
|---|---|---|---|
| 7,286,256 B2* | 10/2007 | Herbert | H04N 1/00474 358/1.15 |
| 7,757,298 B2 | 7/2010 | Shuster | |
| 9,088,719 B2 | 7/2015 | Yi | |
| 9,094,709 B2 | 7/2015 | Jeong | |
| 9,155,074 B2 | 10/2015 | Wang et al. | |
| 9,305,211 B2 | 4/2016 | Kwon et al. | |
| 9,600,153 B2 | 3/2017 | Roh | |
| 9,665,168 B2 | 5/2017 | Oshima et al. | |
| 9,858,754 B2 | 1/2018 | Lyons | |
| 10,078,376 B2* | 9/2018 | Göktekin | G06F 40/58 |
| 10,977,491 B2 | 4/2021 | Kim et al. | |
| 11,223,728 B2* | 1/2022 | Kim | H04N 1/00244 |
| 11,233,911 B2 | 1/2022 | Homma | |
| 11,528,370 B2* | 12/2022 | Kim | H04N 1/00411 |
| 2006/0245018 A1 | 11/2006 | Byun | |
| 2008/0216149 A1 | 9/2008 | Rhoads | |
| 2009/0322893 A1 | 12/2009 | Stallings | |
| 2010/0134291 A1 | 6/2010 | Lavedas | |
| 2011/0055695 A1* | 3/2011 | Oh | H04N 1/56 715/274 |
| 2011/0111806 A1 | 5/2011 | Kim et al. | |
| 2011/0304607 A1 | 12/2011 | Ito | |
| 2013/0070122 A1 | 3/2013 | Nijemcevic et al. | |
| 2014/0056475 A1* | 2/2014 | Jang | G06F 3/0488 382/103 |
| 2014/0056478 A1* | 2/2014 | Fan | G06V 20/20 382/103 |
| 2014/0362111 A1 | 12/2014 | Kim | |
| 2015/0022559 A1 | 1/2015 | Kim | |
| 2015/0262007 A1 | 9/2015 | Sesum | |
| 2015/0286899 A1 | 10/2015 | Nakayama | |
| 2015/0325029 A1 | 11/2015 | Li et al. | |
| 2016/0139777 A1* | 5/2016 | Pinho | G06V 10/235 715/771 |
| 2016/0217119 A1 | 7/2016 | Dakin | |
| 2016/0328394 A1* | 11/2016 | Cuthbert | G06F 40/58 |
| 2017/0090693 A1 | 3/2017 | Ku et al. | |
| 2017/0094219 A1* | 3/2017 | Kim | H04N 5/76 |
| 2017/0244907 A1 | 8/2017 | Lee | |
| 2017/0351917 A1 | 12/2017 | Son et al. | |
| 2018/0107360 A1* | 4/2018 | Kim | G06F 1/1686 |
| 2018/0213147 A1 | 7/2018 | Miyamoto | |
| 2018/0276473 A1* | 9/2018 | Kim | G06F 3/0488 |
| 2018/0334959 A1* | 11/2018 | Jagtap | F02C 6/18 |
| 2018/0336226 A1* | 11/2018 | Anorga | G06V 30/40 |
| 2018/0336415 A1 | 11/2018 | Anorga et al. | |
| 2018/0349659 A1* | 12/2018 | Manzari | G06F 3/0484 |
| 2018/0373949 A1 | 12/2018 | Deng | |
| 2019/0020823 A1 | 1/2019 | Jeon | |
| 2019/0087602 A1* | 3/2019 | Park | G06F 40/106 |
| 2019/0199869 A1* | 6/2019 | Kamata | H04N 1/00413 |
| 2019/0324640 A1 | 10/2019 | Park | |
| 2020/0145589 A1 | 5/2020 | Kim | |
| 2020/0210742 A1 | 7/2020 | Kim | |
| 2020/0267267 A1 | 8/2020 | Kim | |
| 2020/0320291 A1 | 10/2020 | Sanjar | |
| 2021/0044762 A1 | 2/2021 | Kim | |
| 2021/0048895 A1* | 2/2021 | Gralewicz | G06F 3/0481 |
| 2021/0150214 A1 | 5/2021 | Xu et al. | |
| 2022/0078294 A1 | 3/2022 | Kim | |
| 2022/0101638 A1 | 3/2022 | Bae | |
| 2022/0343648 A1* | 10/2022 | Chen | G06V 10/82 |
| 2022/0382448 A1* | 12/2022 | Lu | G06F 3/0485 |

FOREIGN PATENT DOCUMENTS

| | | |
|---|---|---|
| CN | 101094290 | 12/2007 |
| CN | 104246678 | 12/2014 |
| EP | 3 310 035 | 8/2017 |
| IN | 201844009926 | 10/2018 |
| JP | 2005-135210 | 5/2005 |
| KR | 10-2013-0116902 | 10/2013 |
| KR | 1020140030361 | 3/2014 |
| KR | 10-2015-0037374 | 4/2015 |
| KR | 10-2018-0041366 | 4/2018 |
| KR | 1020180109304 | 10/2018 |

OTHER PUBLICATIONS

Chinese Office Action dated Apr. 26, 2021 issued in counterpart application No. 202010102857.X, 8 pages.
European Search Report dated Jul. 13, 2021 issued in counterpart application No. 20158265.7-1231, 6 pages.
European Search Report dated Apr. 20, 2020 issued in counterpart application No. 20158265.7-1231, 8 pages.
International Search Report dated Jun. 11, 2020 issued in counterpart application No. PCT/KR2020/002434, 8 pages.
Indian Examination Report dated Mar. 10, 2022 issued in counterpart application No. 202117040034, 7 pages.
EP Summons to Attend Oral Proceedings dated Apr. 21, 2023 issued in counterpart application No. 20158265.7-1224, 10 pages.
Korean Office Action dated Sep. 18, 2023 issued in counterpart application No. 10-2018-0092226, 14 pages.
Chinese Office Action dated Nov. 24, 2023 issued in counterpart application No. 202110785310.9, 19 pages.
Korean Office Action dated Oct. 26, 2023 issued in counterpart application No. 10-2019-0018890, 11 pages.
EP Minutes dated Nov. 13, 2023 issued in counterpart application No. 20158265.7, 2 pages.

* cited by examiner

ND OPERATING METHOD THEREOF

ELECTRONIC DEVICE FOR PROVIDING VARIOUS FUNCTIONS THROUGH APPLICATION USING A CAMERA AND OPERATING METHOD THEREOF

CROSS-REFERENCE TO RELATED APPLICATION(S)

This application is a Continuation application of Ser. No. 17/529,807, filed on Nov. 18, 2021 in the U.S. Patent and Trademark Office, which is a Continuation Application of U.S. patent application Ser. No. 16/794,984, filed on Feb. 19, 2020, and patented as U.S. Pat. No. 11,223,728 on Jan. 11, 2022, in the U.S. Patent and Trademark Office, and is based on and claims priority under 35 U.S.C. § 119(a) to Korean Patent Application No. 10-2019-0018890, filed on Feb. 19, 2019, in the Korean Intellectual Property Office, the disclosure of which is incorporated herein by reference in its entirety.

BACKGROUND

1. Field

The disclosure relates to an electronic device which provides various functions via an application using a camera, and an operation method therefor.

2. Description of Related Art

Electronic devices (e.g., a mobile terminal, a smart phone, a wearable device, and the like) are capable of providing various functions. For example, an electronic device may provide functions, such as, for example, a voice communication function, a data communication function, a short-range wireless communication function (e.g., Bluetooth™, near field communication (NFC), or the like), a mobile communication function (e.g., $3^{rd}$ generation (3G), 4G, 5G, or the like), a music or video reproduction function, a photographing or video recording function, a navigation function, or the like.

More particularly, an electronic device may provide a function of recognizing a document taken by a camera.

SUMMARY

In accordance with an aspect of the disclosure, a portable communication device including a camera; a touchscreen display; a memory storing a camera application; and a processor is provided. The processor is configured to display a user interface of the camera application, wherein the user interface comprises a preview image corresponding to an image being obtained via the camera; while the preview image is displayed in the user interface, determine an area of the preview image in which a text is included; and while the preview image is displayed in the user interface, display a first graphical object corresponding to a function related to the area including the text.

In accordance with another aspect of the disclosure, A method of operating a portable communication device, the method including displaying a user interface of the camera application, wherein the user interface comprises a preview image corresponding to an image being obtained via the camera; while the preview image is in the user interface, determining an area of the preview image in which a text is recognized; and displaying a first graphical object corresponding to a function related to the text.

BRIEF DESCRIPTION OF THE DRAWINGS

The above and other aspects, features, and advantages of the disclosure will be more apparent from the following detailed description, when taken in conjunction with the accompanying drawings, in which.

DETAILED DESCRIPTION

Figure 1:
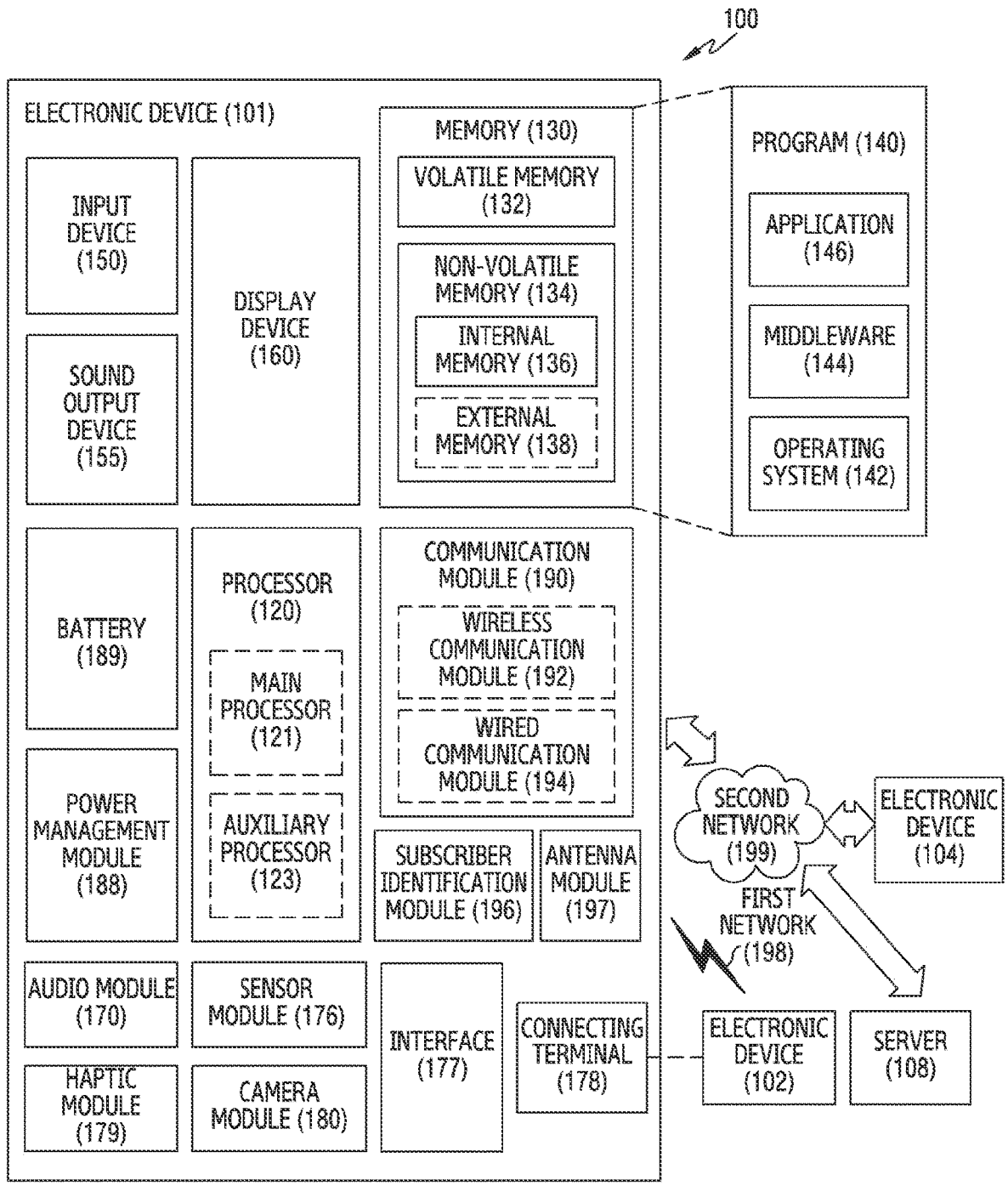
FIG. 1 is a block diagram illustrating an electronic device in a network environment, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. The embodiments and the terms used therein are not intended to limit the technology disclosed herein to specific forms, and should be understood to include various modifications, equivalents, and/or alternatives to the corresponding embodiments. A singular expression may include a plural expression unless they are definitely different in a context.

FIG. 1 is a block diagram illustrating an electronic device in a network environment, according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store data used by at least one component (e.g., the processor 120 or the sensor module 176) of the electronic device 101. The data may include, for example, software (e.g., the program 140) and input data or output data for a command related thereto. The memory 130 includes the volatile memory 132 or the non-volatile memory 134.

The program 140 may be stored in the memory 130 as software, and includes an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to an embodiment, when running a first application, the processor 120 may control the camera module 180 so as to obtain at least one image, and may control the display device 160 so as to display at least one image on a preview screen. The first application may be an application that provides a photography function using a camera. For example, the first application may be a camera application that provides at least one of a photography function or a video recording function. However, embodiments described below may not be limited thereto, and may be applied to various applications using a camera.

According to an embodiment, the processor 120 may determine whether a document is included in at least one image obtained by the camera module 180. The processor 120 may determine whether a document is included in an image based on whether text exists in at least one image, and/or whether a code provided in a predetermined form (e.g., a bar code or a QR code) is included in at least one image. For example, if text, such as characters and/or numbers, or a code provided in the predetermined form, is not included in the image, the processor 120 may determine that a document is not included in an image. As another example, if text, such as characters and/or numbers, exists in an image, the processor 120 may determine whether a document is included in the image based on the shape of an object including the text in the image. For example, the processor 120 may determine whether a document is included in the image based on the number of segments (or sides) or the number of vertices of an object including text in the image. If the number of segments and/or the number of vertices detected from around the text do not satisfy a predetermined condition, the processor 120 may determine that a document is not included in the image. If the number of segments and/or the number of vertices detected from around the text satisfy a predetermined condition, the processor 120 may determine that a document is included in the image. When four vertices are detected from around the text, and text exists inside a quadrangular shape that connects the four vertices, the processor 120 may determine that a document is included in the image. As another example, if a code in a predetermined form (e.g., a bar code or a QR code) is included in the image, the processor 120 may determine that a document is included in the image. The above-described methods that determine whether text is included in the image are merely examples, and the embodiments of the disclosure are not limited thereto.

According to an embodiment, the processor 120 may provide a user interface based on whether a document is included in an image. If a document is not included in at least one image, the processor 120 may provide a first user interface for photographing an image. The first user interface may include at least one first graphic object related to photographing an image. A graphic object may include, for example, at least one of a button, an icon, a symbol, an item, or a menu, which is visually displayed. For example, the first user interface may include at least one of a first button for providing a photography function or a second button for providing a video recording function. If a document is included in at least one image, the processor 120 may provide a second user interface for providing a document-related function. The second user interface may include at least one first graphic object related to photographing an image, and may additionally include at least one of a second graphic object indicating that a document exists in an image and at least one third graphic object that provides a document-related function. The second graphic object indicating that a document exists in an image may include at least one of an icon, a symbol, an item, or a graphic effect, which visually reports that the existence of a document is recognized. For example, the second graphic object indicating that a document exists in an image may include at least one of a predetermined symbol or a graphic effect that indicates an area where the existence of a document is recognized (or identified). The at least one third graphic object providing a document-related function may include, for example, at least one of a scan button for providing a function of scanning a document, a payment button for providing a payment function based on information included in a document, a web access button for providing a function of accessing a web page based on information included in a document, a schedule add button for providing a function of adding a schedule based on information included in a document, a contact information add button for providing a function of adding contact information based on information included in a document, or an additional information search button for providing a function of searching for additional information based on information included in a document. The above-mentioned third graphic objects are merely examples, and embodiments are not limited thereto. The second user interface may include, for example, at least one of a first button for providing a photography function or a second button for providing a video recording function, and may additionally include a symbol indicating the existence of a document in an image, or at least one of a scan button, a web access button, a payment button, or a schedule add button. A third graphic object to be included in the second user interface may be determined based on the document type of a document included in an image, and/or information included in the document.

According to an embodiment, the processor 120 may perform a photography-related function or may perform a document-related function based on a user input in a state in which the second user interface is displayed. In the state in which the second user interface is displayed, if a user input to at least one first graphic object is detected, the processor 120 may perform a photography function or a video recording function. An image obtained via the photographic function or the video recording function may include an image displayed on a preview screen. In the state in which the second user interface is displayed, if a user input to at least one third graphic object is detected, the processor 120 may perform a document-related function. For example, if the third graphic object on which a user input is detected is an object for providing a scan function, the processor 120 may extract and store a document from an image. As another example, if the third graphic object on which a user input is detected is an object for providing a web page access function, the processor 120 may obtain web address information from a document included in an image, and may access a corresponding web page using the obtained web address. As another example, if the third graphic object on which a user input is detected is an object that provides a payment function, the processor 120 may obtain payment information from a document included in an image, and may perform a payment function using the obtained payment information. As another example, if the third graphic object on which a user input is detected provides a schedule add function, the processor 120 may obtain schedule information from a document included in an image, and may add the obtained schedule information to a schedule management application.

According to an embodiment, the processor 120 may determine whether a document included in an image is recognizable, and may provide a user interface based on the recognizability. According to an embodiment, the processor 120 may determine whether the document included in the image is recognizable, based on at least one of the size of the document or the distortion level of the document. For example, if the size of the document is greater than a predetermined maximum size, or less than a predetermined minimum size, the processor 120 may determine that the document included in the image is not recognizable. As another example, if the distortion level of the document is beyond a predetermined level range, the processor 120 may determine that the document included in the image is not recognizable. If the document included in the image is recognizable, the processor 120 may provide a second user interface. If the document included in the image is not recognizable, the processor 120 may provide a third user interface including an error report message, which indicates that the document is not recognizable. The error report message may include, for example, a message that requests adjustment of at least one of a photography location, a photographing direction, or a subject distance for photography (e.g., the distance between the document and the electronic device). The third user interface may include at least one first graphic object related to photographing and an error report message, and may additionally include at least one of a second graphic object indicating that a document exists in an image or at least one third graphic object that provides a document-related function. The at least one third graphic object included in the third user interface may be in a deactivated state. For example, the at least one third graphic object included in the third user interface may be deactivated so as to indicate that a document-related function is not allowed to perform.

According to an embodiment, the processor 120 may determine at least one document-related function based on at least one of the document type of the document included in the image or information included in the document. The processor 120 may determine at least one third graphic object to be included in the second user interface based on the at least one determined function. The processor 120 may identify the document type of the document included in the image, and may determine whether the identified type of document is a type providing a single function or a type providing a plurality of functions based on a table listing a related function for each type of document. The processor 120 may determine the type of document based on information included in the document or the form of the document.

For example, if a table is detected from the document included in the image, or if schedule information including time and/or place information is detected, the processor 120 may determine the type of document as a first type (e.g., a poster, a memo, or a calendar). As another example, if a code in a predetermined form is detected, the processor 120 may determine the type of document as a second type (e.g., a barcode or a QR code). As another example, if at least one of publisher information or author information is detected from the document included in the image, the processor 120 may determine the type of document as a third type (e.g., a book). As another example, if at least one piece of information among a user name, a company name, a company address, a phone number, a fax number, or an email address is detected from the document included in the image, the processor 120 may determine the type of document as a fourth type (e.g., a business card). As another example, if information corresponding to the first type to the fourth type is not detected, the processor 120 may determine the type of document as a fifth type (e.g., miscellaneous documents). The method of determining the type of document is merely an example, and embodiments are not limited thereto.

The table listing a related function for each type of document may be, for example, a table listing a related function for each type, such as "a document type: a first type (e.g., a poster, a memo, or a calendar), a related function: a scan function or a schedule add function", "a document type: a second type (e.g., a QR code or a barcode), a related function: a payment function or a web access function", a document type: a third type (e.g., a book), a related function: a scan function or an additional information search function", "a document type: a fourth type (e.g., a business card), a related function: a scan function or, a contact information add function", and "a document type: a fifth type (e.g., miscellaneous documents), a related function: a scan function". Embodiments of the present disclosure are not limited to the above-described examples.

If a single related function is determined for the identified type of document, the processor 120 may determine the type of document as a type that provides a single function, and may determine a third graphic object that is capable of performing the single function. If a plurality of related functions are determined for the identified type of document, the processor 120 may determine the type of document as a type that provides a plurality of functions, and may determine a third graphic object capable of performing a single function or a plurality of third graphic objects corresponding to the plurality of functions on the basis of information included in the document.

For example, if the document included in the image is the first type, the processor 120 may recognize text included in the document, and may determine whether schedule information (e.g., time information or place information) is included in the document. If schedule information is included in the document, the processor 120 may determine a scan function and a schedule add function as document-related functions, and may determine a scan button for providing a function of scanning a document and a schedule add button for providing a function of adding schedule information to a predetermined application (e.g., a calendar application or a schedule application) as third graphic objects. If schedule information is not included in the document, the processor 120 may determine a scan function as a document-related function, and may determine a scan button for providing a function of scanning a document as a third graphic object.

As another example, if the document included in the image is the second type (e.g., a QR code or a barcode), the processor 120 may analyze a code in the document, and may determine whether payment information and web address information are included. If the code in the document includes only web address information, the processor 120 may determine a web access button for accessing a corresponding web page and providing information, as a third graphic object. If the code in the document includes web address information and payment information, the processor 120 may determine a web access button and a payment button as third graphic objects.

As another example, if the document included in the image is the third type (e.g., a book, a research paper, or a leaflet), the processor 120 may recognize text included in the document, and may determine whether searchable information is included in the document. If searchable information is included in the document, the processor 120 may determine a scan function and an additional information search function as document-related functions, and may determine a scan button for providing a scan function and a search button for providing an additional information search function as third graphic objects.

As another example, if the document included in the image is the fourth type (e.g., a business card), the processor 120 may determine a scan function and a contact information add function as document-related functions, and may determine a scan button for providing a scan function and a contact information add button for providing a function of registering contact information included in a business card with an electronic device, as third graphic objects.

As another example, if the document included in the image is the fifth type (e.g., miscellaneous documents), the processor 120 may determine a scan function as a document-related function, and may determine a scan button that provides a scan function as a third graphic object. The processor 120 may provide the second user interface including the at least one determined third graphic object.

In the above description, the processor 120 may determine at least one of whether a document is included in an image, the document type of a document included in an image, or a document-related function, based on a document-related database (DB) included in the memory 130 of the electronic device 101. The document-related DB may include various types of information (e.g., a reference value, a condition, a rule for determining a document, or a function), which are needed to determine at least one of whether a document is included in an image, the document type of a document included in an image, and a document-related function. If the processor 120 fails to determine at least one of whether a document is included in an image, the document type of a document included in an image, and a document-related function, using the document-related DB included in the memory 130, the processor 120 may transmit the image to an external device (e.g., the electronic device 102, the electronic device 104, or the server 108), and may receive at least one piece of information among whether a document is included in the image, the document type of a document included in the image, or a document-related function from the external device (e.g., the electronic device 102, the electronic device 104, or the server 108). The document-related DB included in the memory 130 may be updated via interoperation with the external device (e.g., the electronic device 102, the electronic device 104, or the server 108), and may be updated by learning.

According to an embodiment, an electronic device may include a camera, a display, and a processor. The processor is configured to determine whether a document is included in an image provided from the camera. When a document is not included in the image, the processor is configured to provide a first user interface including at least one first graphic object for photographing the image. When a document is included in the image, the processor is configured to provide a second user interface for providing a function related to the document. The second user interface includes the at least one first graphic object, a second graphic object indicating that a document exists in the image, and at least one third graphic object for performing a function related to a document.

The second graphic object may include at least one of a predetermined symbol indicating that a document exists in the image or a graphic effect indicating an area where a document is recognized in the image.

When a document is included in the image, the processor is configured to determine whether the document is recognizable, based on whether the document satisfies a predetermined condition, and when the document is recognizable, the processor is configured to determine at least one function related to the document based on a type of document or information included in the document.

The at least one function related to the document may include at least one of a function of scanning the document, a function of searching for additional information related to the document, a payment function based on information included in the document, a web access function based on information included in the document, a schedule add function based on information included in the document, and a function of adding contact information based on information included in the document.

The second user interface may include a third graphic object that provides a function of scanning the document. When a user input to the third graphic object, which provides the function of scanning the document, is detected in the state in which the second user interface is provided, the processor is configured to extract and store only the document from the image. When a user input to the first graphic object is detected in the state in which the second user interface is provided, the processor is configured to photograph the image including the document and store the image.

The processor may determine whether at least one of a size of the document or a distortion level of the document satisfies the predetermined condition.

When the document is not recognizable, the processor may provide a third user interface including an error report message related to at least one of the size of the document or the distortion level of the document, and the third user interface may further include at least one of the at least one first graphic object or the second graphic object indicating that a document exists in the image.

The third user interface may further include at least one third graphic object for performing a function related to the document, and the at least one third graphic object may be in a deactivated state.

Figure 2:
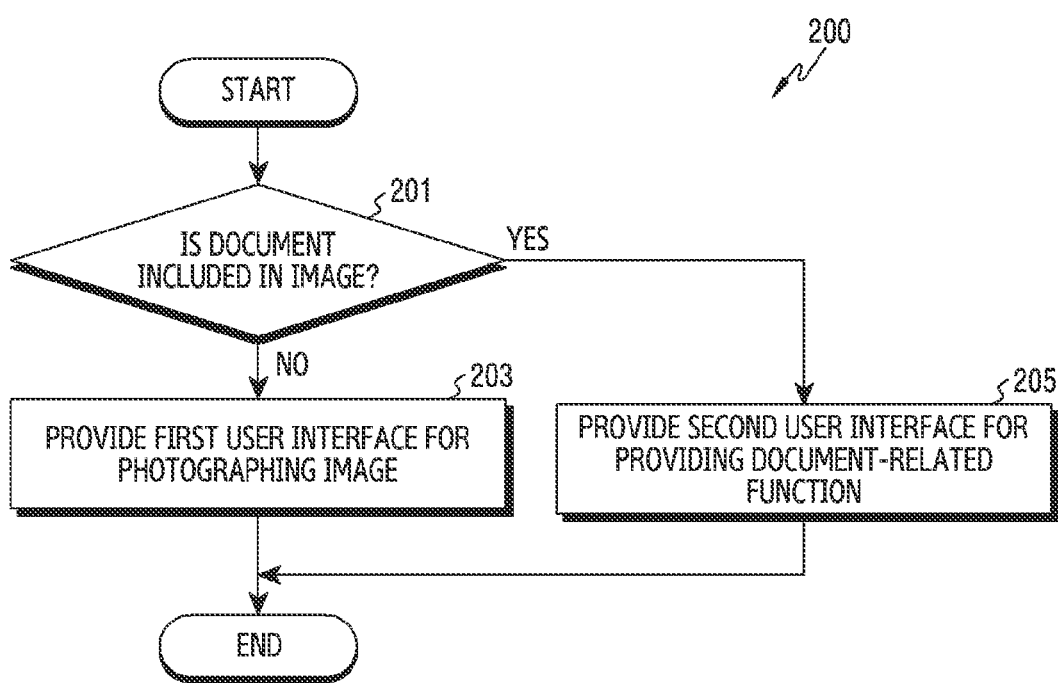
FIG. 2 is a flowchart illustrating a process of providing various user interfaces based on whether a document is included in an image, by an electronic device, according to an embodiment.

FIG. 2 is a flowchart 200 illustrating a process of providing various user interfaces based on whether a document is included in an image, by an electronic device, according to an embodiment. In the embodiment provided hereinafter, operations may be performed sequentially, but it is not necessary. For example, the order of operations may be changed, and at least two operations may be performed in parallel. Here, an electronic device may be the electronic device 101 of FIG. 1. Hereinafter, at least some steps of FIG. 2 will be described with reference to FIGS. 3A, 3B, and 4.

Figure 3A:
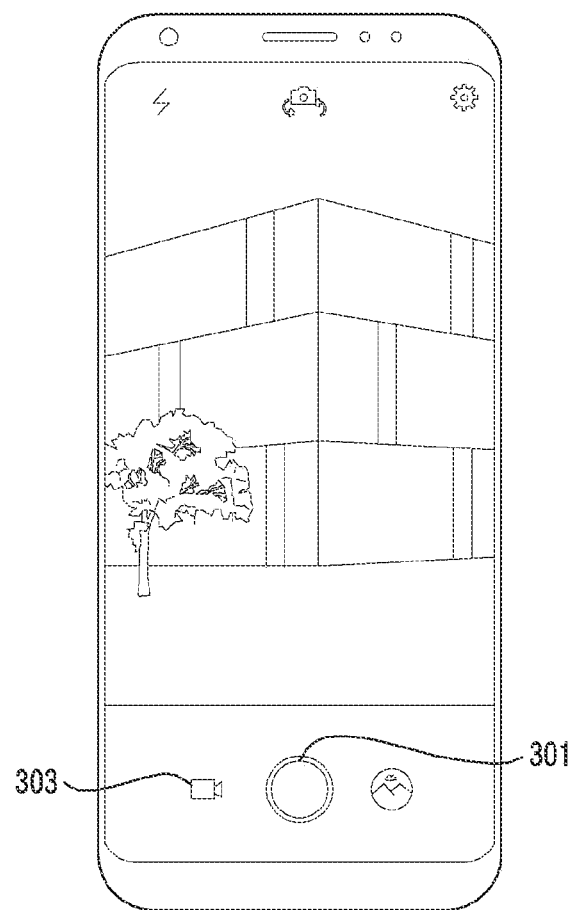
FIG. 3A is a diagram illustrating an example of a user interface provided based on whether a document is included in an image, by an electronic device, according to an embodiment.
Figure 3B:
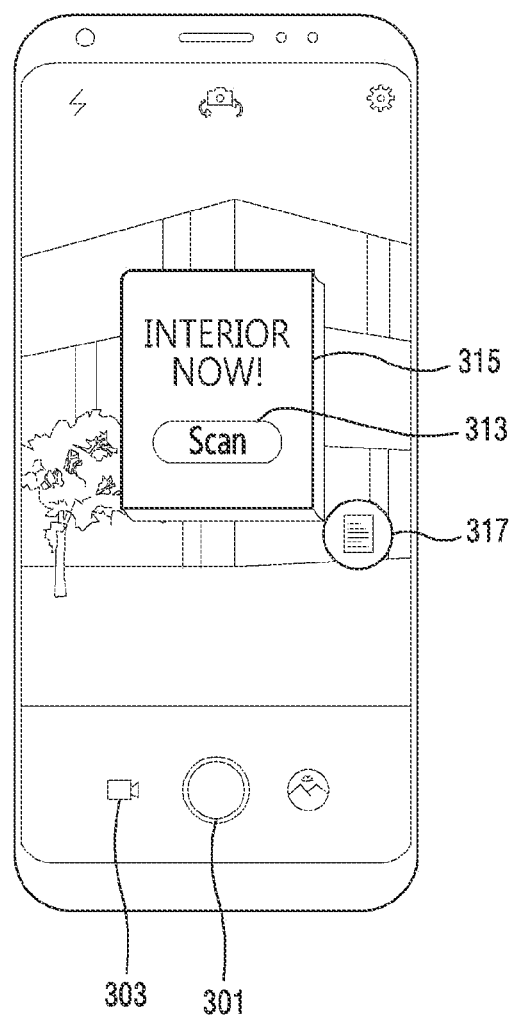
FIG. 3B is a diagram illustrating an example of a user interface provided based on whether a document is included in an image, by an electronic device, according to an embodiment.
Figure 4:
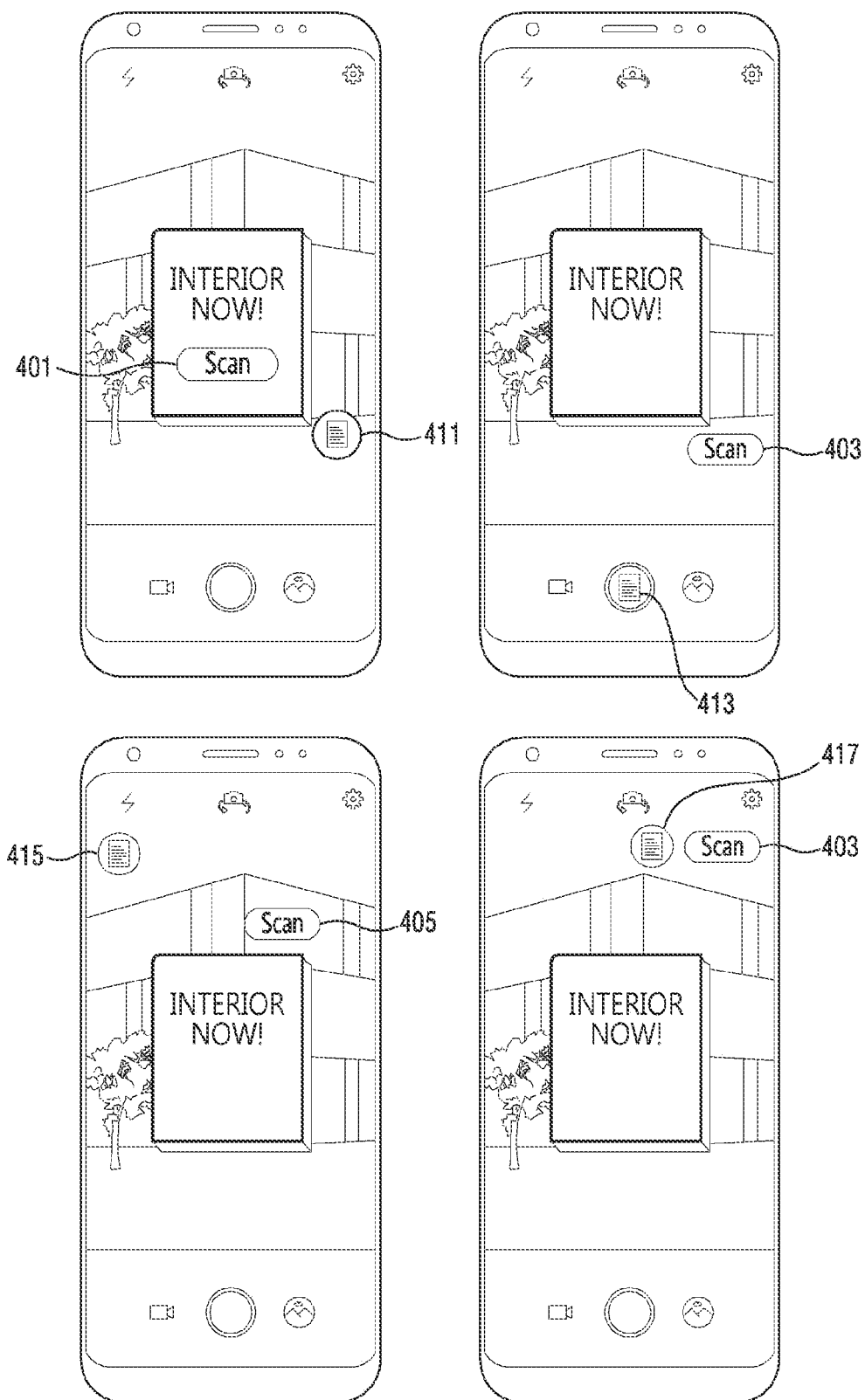
FIG. 4 is a diagram illustrating an example of a user interface including at least one graphic object related to a document, in an electronic device, according to an embodiment.

FIG. 3A is a diagram illustrating an example of a user interface provided based on whether a document is included in an image, by an electronic device, according to an embodiment. FIG. 3B is a diagram illustrating an example of a user interface provided based on whether a document is included in an image, by an electronic device, according to an embodiment. FIG. 4 is a diagram illustrating an example of a user interface including at least one graphic object related to a document, in an electronic device, according to an embodiment.

Referring to flowchart 200 of FIG. 2, an electronic device (e.g., the processor 120 of FIG. 1) determines whether a document is included in an image provided from a camera 180, in step 201. The processor 120 may determine whether a document is included in at least one image provided from the camera 180 based on whether text exists in at least one image and/or a code in a predetermined form (e.g., a barcode or a QR code) is included. For example, if text or a code provided in the predetermined form is not included in an image displayed on a preview screen, the processor 120 determines that a document is not included in the image. As another example, if text exists in the image, the processor 120 detects a segment or a vertex of an object including the text in the image, and if the number of the detected segments and/or the number of vertices does not satisfy a predetermined condition, the processor 120 determines that a document is not included in the image. If the number of segments and/or the number of vertices detected from around the text satisfies a predetermined condition, the processor 120 may determine that a document is included in the image. As another example, if a code in a predetermined form is included in the image, the processor 120 determines that a document is included in the image. The above-described methods of determining whether text is included in an image are merely examples, and embodiments of the disclosure are not limited thereto.

If a document is not included in the image, the electronic device (e.g., the processor 120) provides a first user interface for photographing an image, in step 203. The first user interface may include at least one first graphic object related to photographing an image. A graphic object may include, for example, at least one of a button, an icon, a symbol, an item, or a menu, which is visually displayed. For example, as illustrated in FIG. 3A, if a document is not included in the image displayed on a preview screen, the processor 120 provides a first user interface including a photographing button 301 for providing a photography function and a video recording button 303 for providing a video recording function.

If a document is included in the image, the electronic device (e.g., the processor 120) provides a second user interface for providing a document-related function, in step 205. The second user interface may include at least one first graphic object related to photographing an image, and may additionally include at least one of a second graphic object indicating that a document exists in an image or at least one third graphic object that provides a document-related function. The second graphic object indicating that a document exists in an image may include at least one of an icon, a symbol, an item, or a graphic effect which visually reports that the existence of the document is recognized. For example, the second graphic object indicating that a document exists in an image may include at least one of a predetermined symbol or a graphic effect that indicates an area where a document is recognized. The at least one third graphic object that provides a document-related function may include, for example, at least one of a scan button for providing a function of scanning a document, a payment button for providing a payment function based on information included in a document, a web access button for providing a function of accessing a web page based on information included in a document, or an add button for providing a function of adding a schedule based on information included in a document. The above-mentioned third graphic objects are merely examples, and embodiments of the present disclosure are not limited thereto.

For example, as illustrated in FIG. 3B, if a document is included in the image displayed on a preview screen, the processor 120 provides a second user interface including a photographing button 301 that provides a photography function, a video recording button 303 for providing a video recording function, a scan button 313 for providing a function of scanning a document, a symbol 317 indicating that a document exists in an image, and a graphic effect 315 indicating an area where a document is recognized. The display location and/or the size of a second graphic object and/or a third graphic object to be included in the second user interface may be set and changed by a designer and/or a user.

For example, as illustrated in FIG. 4, a scan button 401, 403, 405, and 407, which is a third graphic object and a symbol 411, 413, 415, and 417, which is a second graphic object and indicates the existence of a document may be displayed in an area predetermined by a designer and/or a user. The symbol that is a second graphic object and indicates the existence of a document may not trigger a predetermined function, and may be displayed on a photographing button as shown in diagram 413 of FIG. 4. As another example, the processor 120 may dynamically change the display location of a second graphic object and/or a third graphic object based on the location of a document included in an image. For example, every time that the location of a document in an image is changed, the processor 120 may dynamically change the display location of a third graphic object based on the changed location of the document. A third graphic object included in the second user interface may be determined based on the type of a document included in an image, and/or information included in the document.

Figure 5:
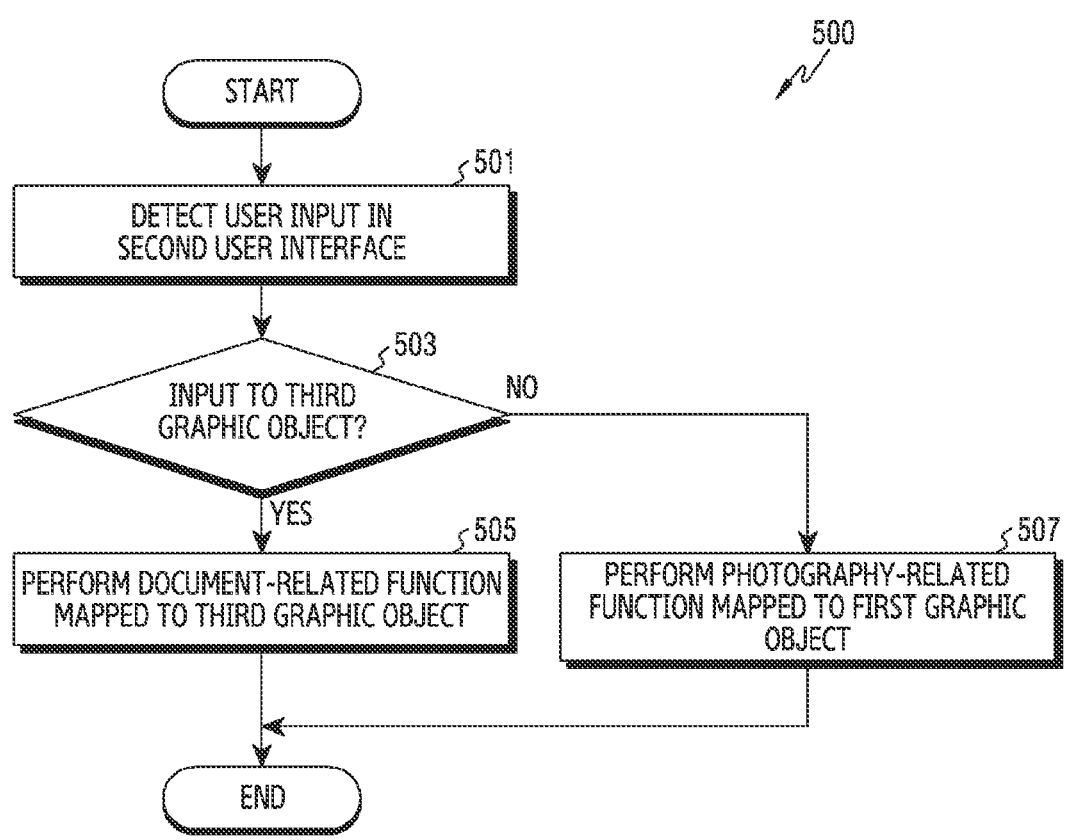
FIG. 5 is a flowchart illustrating a process of performing a function corresponding to a user input when a document exists in an image, by an electronic device, according to an embodiment.

FIG. 5 is a flowchart 500 illustrating a process of performing a function corresponding to a user input when a document exist in an image, by an electronic device, according to an embodiment. Operations of FIG. 5, which are described below, may be operations subsequent to step 205 of FIG. 2. In the embodiment provided hereinafter, operations may be performed sequentially, but it is not necessary. For example, the order of operations may be changed, and at least two steps may be performed in parallel. Here, an electronic device may be the electronic device 101 of FIG. 1. Hereinafter, at least some operations of FIG. 5 will be described with reference to FIGS. 6A and 6B.

Figure 6A:
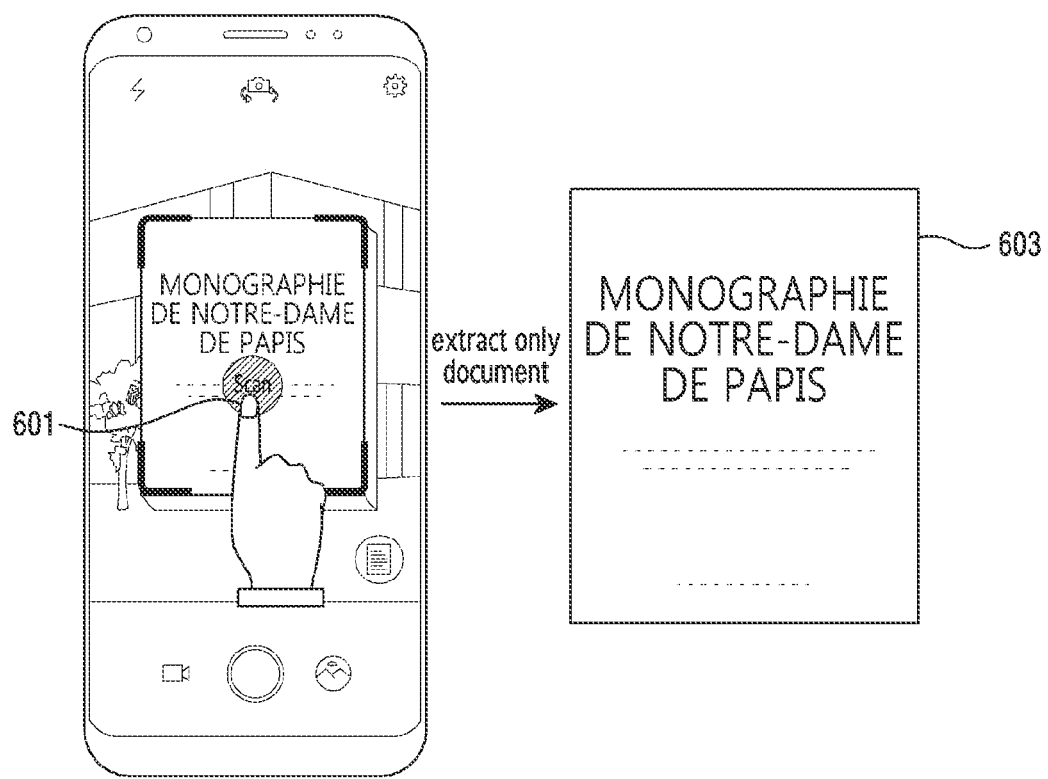
FIG. 6A is a diagram illustrating an example of performing a function corresponding to a user input, by an electronic device, according to an embodiment.
Figure 6B:
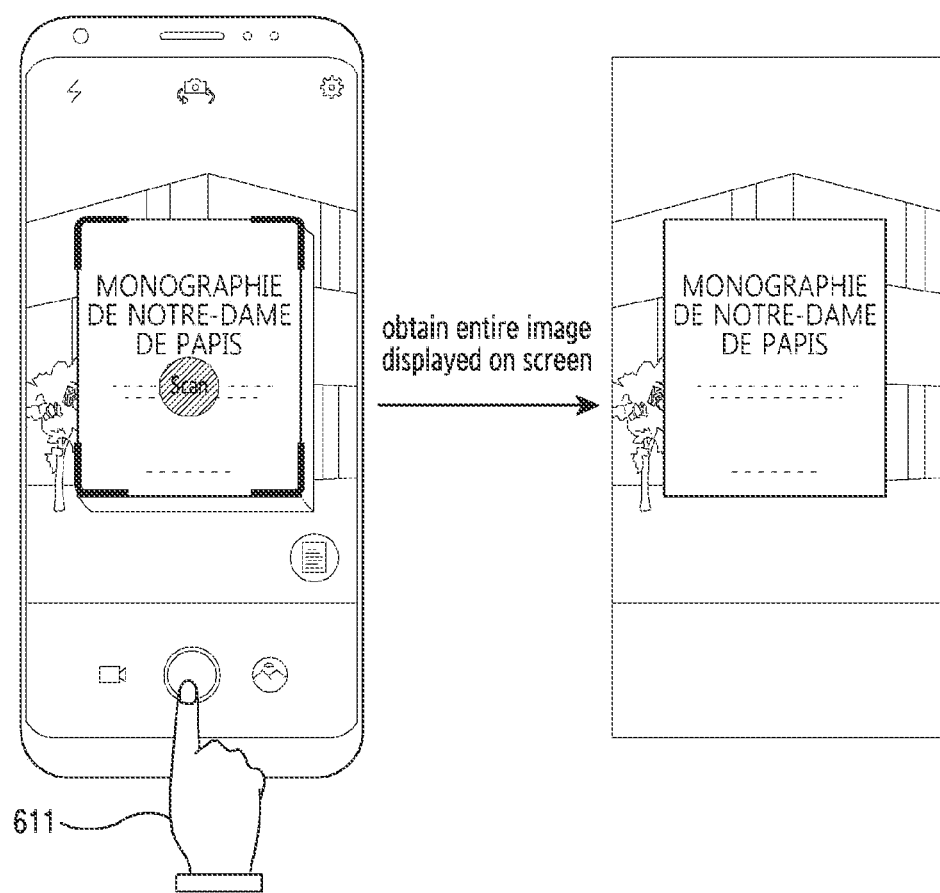
FIG. 6B is a diagram illustrating an example of performing a function corresponding to a user input, by an electronic device, according to an embodiment.

FIG. 6A is a diagram illustrating an example of performing a function corresponding to a user input, by an electronic device, according to an embodiment. FIG. 6B is a diagram illustrating an example of performing a function corresponding to a user input, by an electronic device, according to an embodiment.

Referring to FIG. 5, an electronic device (e.g., the processor 120 of FIG. 1) detects a user input to a second user interface, in step 501. The second user interface may be the same as the second user interface described with reference to step 205 of FIG. 2. A user input may include at least one of a single touch, a double touch, a long touch, or a pressure touch.

The electronic device (e.g., the processor 120) determines whether a user input is an input with respect to a third graphic object, in step 503. For example, the processor 120 may determine whether a user input to a third graphic object is detected, or whether a user input to a first graphic object is detected, among the graphic objects included in the second user interface.

If the user input is an input to the third graphic object, the electronic device (e.g., the processor 120) performs a document-related function mapped to the third graphic object, in step 505. As illustrated in FIG. 2, the third graphic object may include, for example, at least one of a scan button, a payment button, a web access button, or a schedule add button. For example, as illustrated in FIG. 6A, if a user input 601 to a scan button is detected, the processor 120 extracts a document from an image, and performs a function of storing the extracted document 603. As another example, if a user input to a payment button is detected, the processor 120 may obtain payment information from a document included in an image, and may perform a payment function based on the payment information. If a user input to a web access button is detected, the processor 120 may obtain web address information from a document included in an image, and may perform a function of accessing a corresponding web page based on the web address information. If a user input to a schedule add button is detected, the processor 120 may obtain schedule information from a document included in an image, and may add the obtained schedule information to an application that manages a user's schedules (e.g., a calendar application or a schedule management application).

If a user input is not an input to the third graphic object (if the user input is an input to the first graphic object), the electronic device (e.g., the processor 120) performs a photography-related function mapped to the first graphic object where the user input is detected, in step 507. The first graphic object may include, for example, at least one of a photographing button or a video recording button, as illustrated in FIG. 1. For example, as illustrated in FIG. 6B, if a user input 611 to a photographing button is detected, the processor 120 performs a function of obtaining and storing an image which is provided from a camera 180, and is displayed on a preview screen, as an image obtained by photography. This may be the same as a normal photography function.

Figure 7:
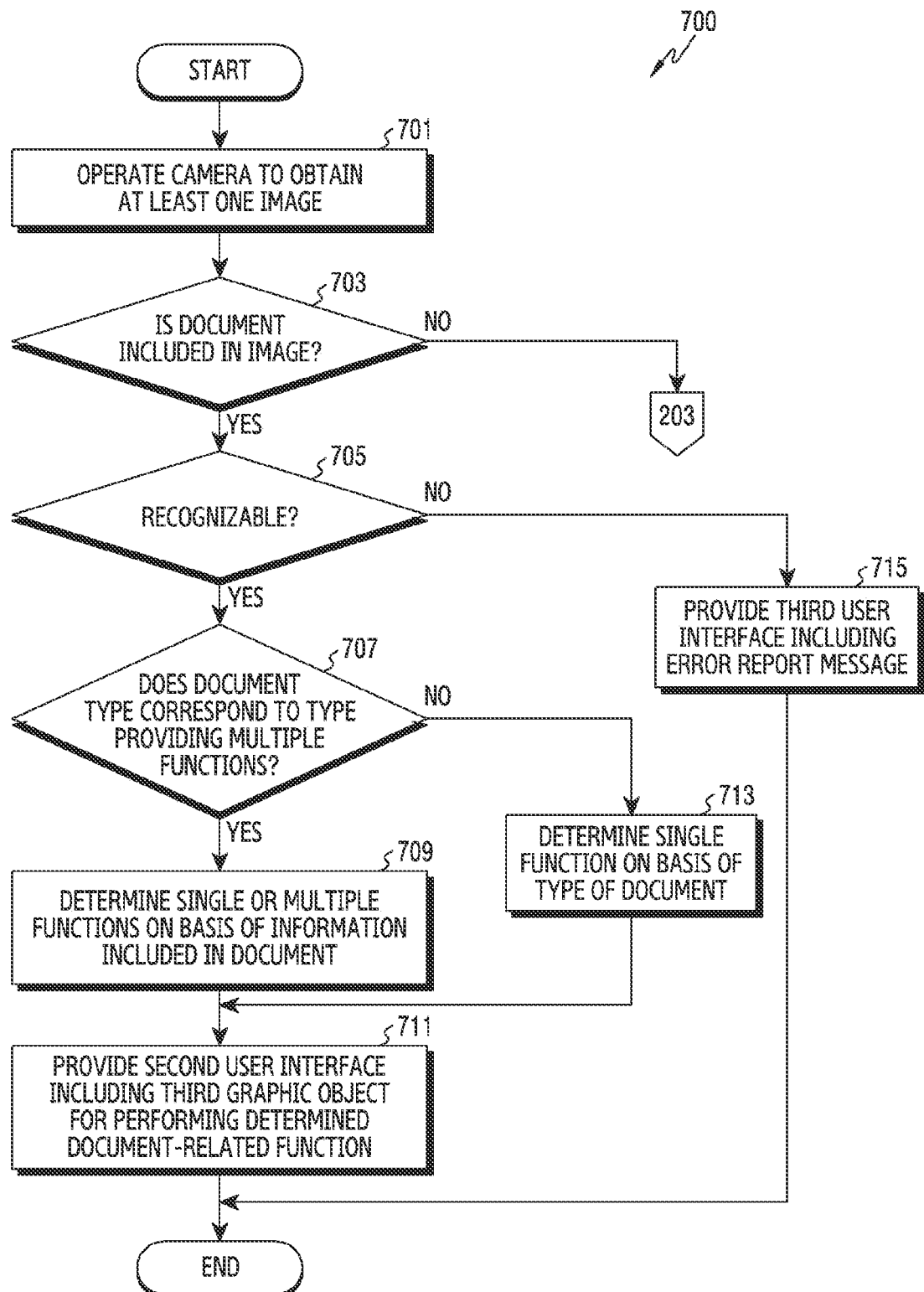
FIG. 7 is a flowchart illustrating a process of providing various user interfaces based on whether a document is recognizable, by an electronic device, according to an embodiment.

FIG. 7 is a flowchart 700 illustrating a process of providing various user interfaces based on whether a document is recognizable, by an electronic device, according to an embodiment. Operations of FIG. 7 described below may be the detailed operations of at least some of steps 201, 203, and 205 of FIG. 2. In the embodiment provided hereinafter, operations may be performed sequentially, but it is not necessary. For example, the order of operations may be changed, and at least two steps may be performed in parallel. Here, an electronic device may be the electronic device 101 of FIG. 1. Hereinafter, at least some operations of FIG. 7 will be described with reference to FIGS. 8A to 8E.

Figure 8A:
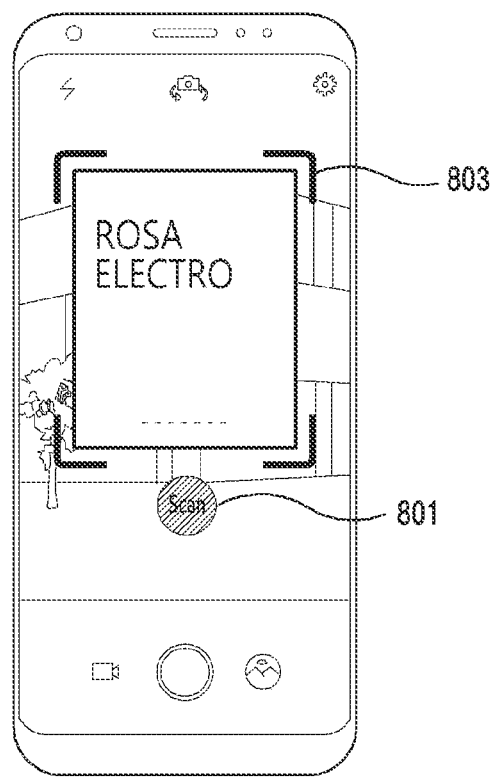
FIG. 8A is a diagram illustrating an example of a user interface that provides a document-related function based on the type of document, by an electronic device, according to an embodiment.
Figure 8B:
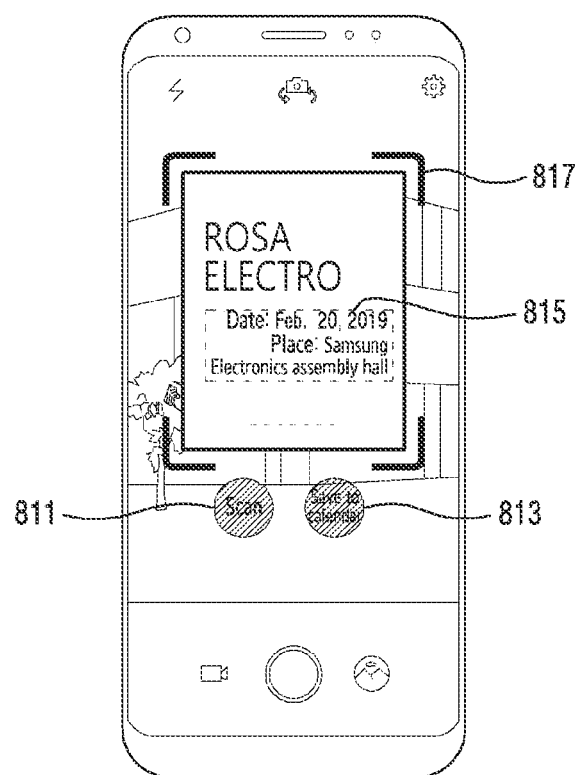
FIG. 8B is a diagram illustrating an example of a user interface that provides a document-related function based on the type of document, by an electronic device, according to an embodiment.
Figure 8C:
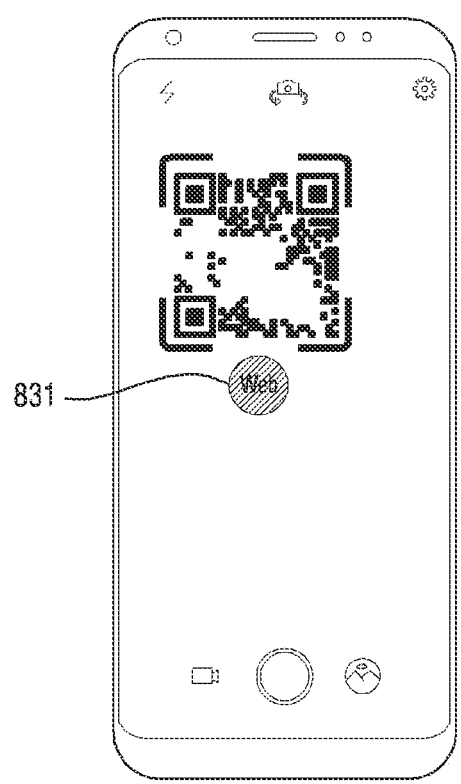
FIG. 8C is a diagram illustrating an example of a user interface that provides a document-related function based on the type of document, by an electronic device, according to an embodiment.
Figure 8D:
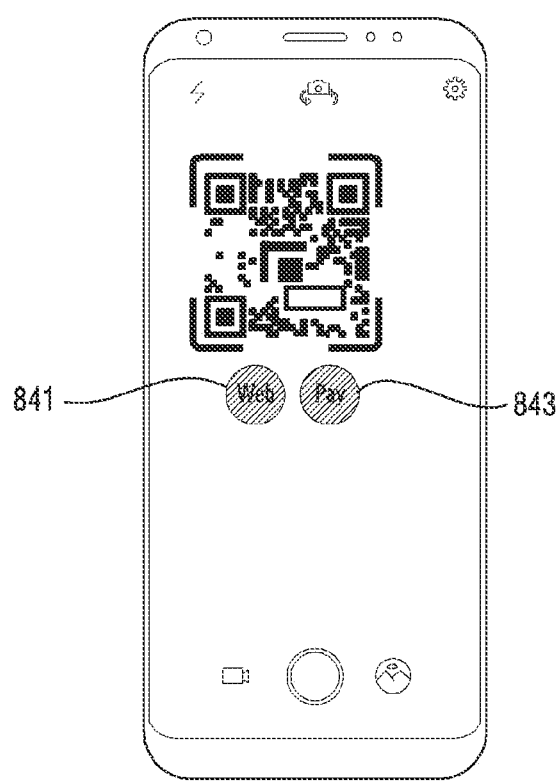
FIG. 8D is a diagram illustrating an example of a user interface that provides a document-related function based on the type of document, by an electronic device, according to an embodiment.
Figure 8E:
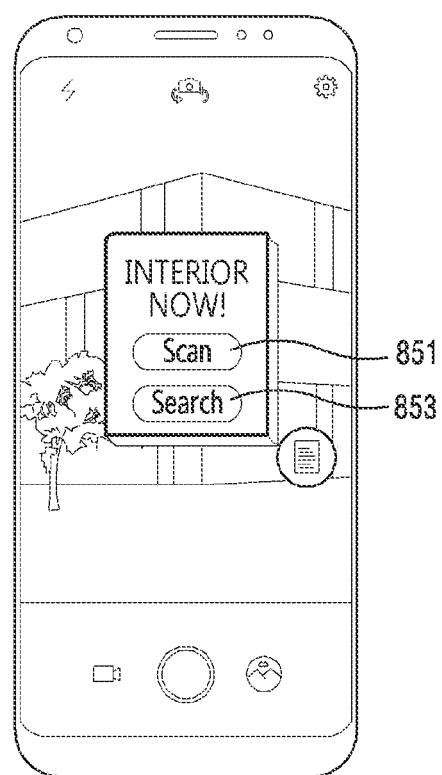
FIG. 8E is a diagram illustrating an example of a user interface that provides a document-related function based on the type of document, by an electronic device, according to an embodiment.

FIG. 8A is a diagram illustrating an example of a user interface that provides a document-related function based on the type of document, by an electronic device, according to an embodiment. FIG. 8B is a diagram illustrating an example of a user interface that provides a document-related function based on the type of document, by an electronic device, according to an embodiment. FIG. 8C is a diagram illustrating an example of a user interface that provides a document-related function based on the type of document, by an electronic device, according to an embodiment. FIG. 8D is a diagram illustrating an example of a user interface that provides a document-related function based on the type of document, by an electronic device, according to an embodiment. FIG. 8E is a diagram illustrating an example of a user interface that provides a document related function based on the type of document, by an electronic device, according to an embodiment.

Referring to flowchart 700 of FIG. 7, an electronic device (e.g., the processor 120 of FIG. 1) may operates a camera (e.g., the camera module 180 of FIG. 1), and obtains at least one image, in step 701. When running a first application, the processor 120 operates the camera 180, and may obtain at least one image from the camera. The processor 120 may control the display device 160 so as to display the at least one image obtained from the camera module 180 on a preview screen. The first application may be an application that provides a photography function using a camera. For example, the first application may be a camera application that provides at least one of a photography function or a video recording function.

The electronic device (e.g., the processor 120) determines whether a document is included in an image, in step 703. The step of determining whether a document is included in the image may be at least partially the same as step 201 of FIG. 2. The processor 120 may determine whether a document is included in the image based on a document-related DB included in a memory 130 of the electronic device 101. The document-related DB may include various types of information (e.g., a reference value, a condition, a rule of determining a document, or a function) needed to determine whether a document is included in the image. If it is identified that determining whether a document is included in the image is difficult using the document-related DB included in the memory 130, the processor 120 may transmit the image to an external device (e.g., the electronic device 102, the electronic device 104, or the server 108) and may request the external device to determine whether a document is included in the image. In response to the request, the processor 120 may receive a response signal including information indicating whether a document is included in the image, from the external device (e.g., the electronic device 102, the electronic device 104, or the server 108). The response signal may additionally include at least one information associated with the document type of a document included in the image or a document-related function, in addition to the information indicating whether a document is included in the image.

If it is determined that a document is not included in the image, the electronic device (e.g., the processor 120) performs step 203 of FIG. 2.

If it is determined that a document is included in the image, the electronic device (e.g., the processor 120) determines whether the document included in the image is recognizable, in step 705. According to an embodiment, the processor 120 may determine whether the document included in the image is recognizable, based on at least one of the size of the document or the distortion level of the document. For example, if the size of the document is greater than a predetermined maximum size, or less than a predetermined minimum size, the processor 120 may determine that the document included in the image is not recognizable. As another example, if the distortion level of the document is beyond a predetermined level range, the processor 120 may determine that the document included in the image is not recognizable.

If the document included in the image is recognizable, the electronic device (e.g., the processor 120) determines whether the document type of the document is a type providing a plurality of functions in step 707. The processor 120 may identify the document type of the document included in the image, and may determine whether a single document-related function or a plurality of document-related functions are used based on the type of document. For example, based on the information included in the document or the form of the document, the processor 120 may determine the type of document, and may determine whether a single document-related function or a plurality of document-related functions are used based on a table listing a related function for each type of document. The table listing a related function for each type of document may be, for example, a table listing a related function for each type, such as "a document type: a first type, a related function: a scan function or a schedule add function", "a document type: a second type, a related function: a payment function or a web access function", "a document type: a third type, a related function: a scan function or an additional information search function", "a document type: a fourth type, a related function: a scan function, a contact information add function", and "a document type: a fifth type, a related function: a scan function". If the identified type of document is any one of the first type to the fourth type, the processor 120 may determine the type of document as a type providing a plurality of functions. If the identified type of document is the fifth type, the processor 120 may determine the type of document as a type that is incapable of providing a plurality of functions (a type providing a single function).

If the type of document is a type providing a plurality of functions, the electronic device (e.g., the processor 120) determines a single or a plurality of functions as document-related functions based on information included in the document, in step 709 and provides a second user interface including at least one third graphic object for performing the document-related function, in step 711. For example, if the document included in the image is the first type, the processor 120 recognizes text included in the document, and may determine whether schedule information (e.g., time information or place information) is included in the document.

If schedule information is not included in the document, as illustrated in FIG. 8A, the processor 120 determines a scan function as a document-related function, and provides a second user interface including a scan button 801 and a graphic effect 803 indicating an area where the document is recognized. If schedule information 815 is included in the document, as illustrated in FIG. 8B, the processor 120 determines a scan function and a schedule add function as document-related functions, and may provide a second user interface including a scan button 811, a schedule add button 813, and a graphic effect 817 indicating an area where the document is recognized.

As another example, if the document included in the image corresponds to the second type (e.g., a QR code or a barcode), the processor 120 may analyze a code in the document, and may determine whether payment information and web address information are included. If the code in the document includes only web address information, as illustrated in FIG. 8C, the processor 120 determines a web access function as a document-related function, and provides a second user interface including a web access button 831. If the code in the document includes web address information and payment information, as illustrated in FIG. 8D, the processor 120 determines a web access function and a payment function as document-related functions, and provides a second user interface including a web access button 841 and a payment button 843.

As another example, if the document included in the image corresponds to the third type (e.g., a book, a research paper, or a leaflet), the processor 120 may recognize text included in the document, and may determine whether searchable information is included in the document. If the searchable information is included in the document, as illustrated in FIG. 8E, the processor 120 determines a scan function and an additional information search function as document-related functions, and may provide a second user interface including a scan button 851 and an additional information search button 853. If the searchable information is not included in the document, the processor 120 may determine a scan function as a document-related function, and may provide a second user interface including a scan button.

As another example, if the document included in the image corresponds to the fourth type (e.g., a business card), the processor 120 may determine a scan function and contact information add button as document-related functions, and may provide a second user interface including a scan button and a contact information add button. The above-described second user interfaces may further include at least one first graphic object related to photographing an image and a second graphic object indicating the existence of a document in an image.

Referring back to FIG. 7, if the type of document is a type providing a single function, the electronic device (e.g., the processor 120) determines a single function based on the information included in the document as a document-related function, in step 713, and provides a second user interface including at least one third graphic object for performing the document-related function determined, in step 711. For example, if the document included in the image corresponds to the fifth type (e.g., miscellaneous documents), the processor 120 may determine a scan function as a document-related function, and may provide a second user interface including a scan button.

If the document included in the image is not recognizable, the electronic device (e.g., the processor 120) provides a third user interface including an error report message indicating that the document is not recognizable, in step 715. The error report message may include, for example, a message that requests adjustment of at least one of a photography location, a photographing direction, or a subject distance for photography (e.g., the distance between a document and an electronic device). The error report message may include, for example, at least one of information associated with the size of the document, information related to the distortion of the document, information associated with a request for adjusting the photography location, information associated with a request for adjusting the subject distance for photography, or information associated with a request for adjusting the photographing direction. The third user interface may include at least one first graphic object related to photographing and an error report message, and may additionally include at least one of a second graphic object indicating that a document exists in an image and at least one third graphic object that provides a document-related function. The at least one third graphic object included in the third user interface may be in a deactivated state. For example, the at least one third graphic object included in the third user interface may be deactivated so as to indicate that the document-related function is not allowed to perform.

Figure 9:
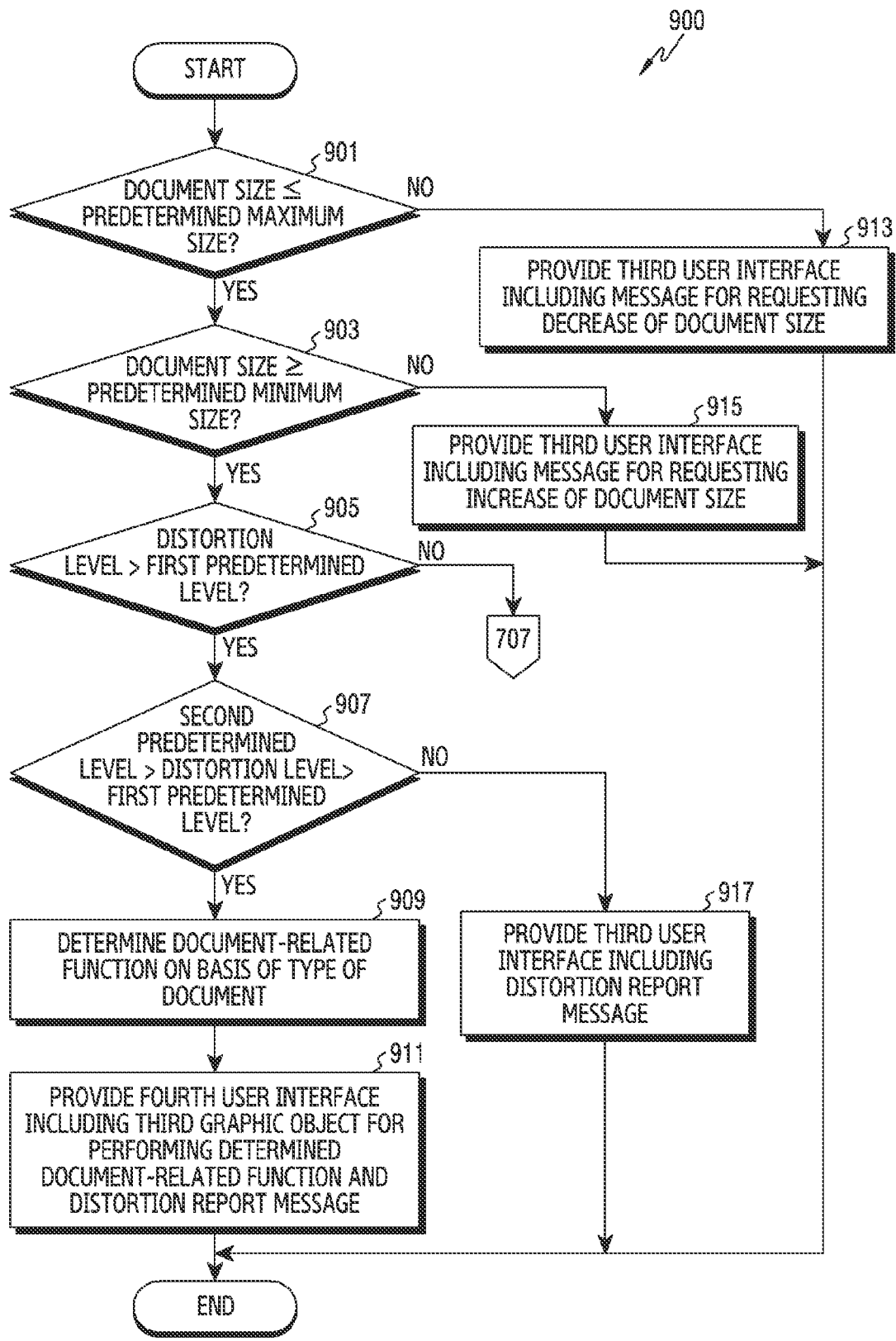
FIG. 9 is a flowchart illustrating a process of providing various user interfaces based on a predetermined condition, by an electronic device, according to an embodiment.

FIG. 9 is a flowchart 900 illustrating a process of providing various user interfaces based on a predetermined condition, by an electronic device, according to an embodiment. Operations of FIG. 9 described below may be the detailed operations of at least some of steps 705 to 715 of FIG. 7. In the embodiment provided hereinafter, steps may be performed sequentially, but it is not necessary. For example, the order of steps may be changed, and at least two steps may be performed in parallel. Here, an electronic device may be the electronic device 101 of FIG. 1. Hereinafter, at least some operations of FIG. 9 will be described with reference to FIGS. 10A to 10C, and FIGS. 11A to 11C.

Figure 10A:
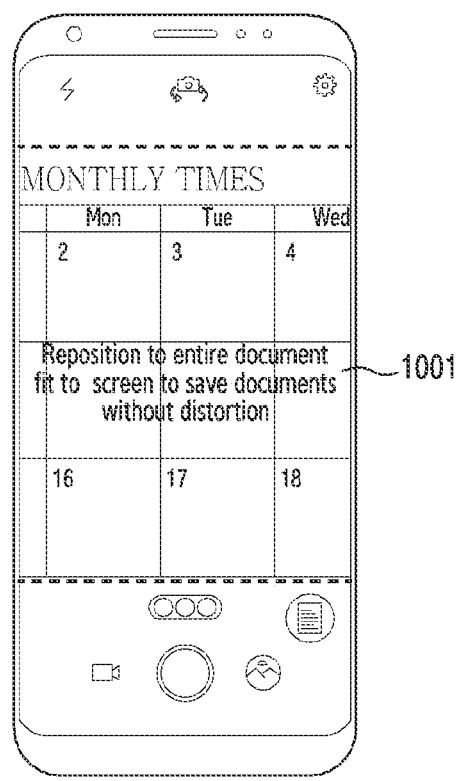
FIG. 10A is a diagram illustrating an example of a user interface including an error report message related to the size of a document, in an electronic device, according to an embodiment.
Figure 10B:
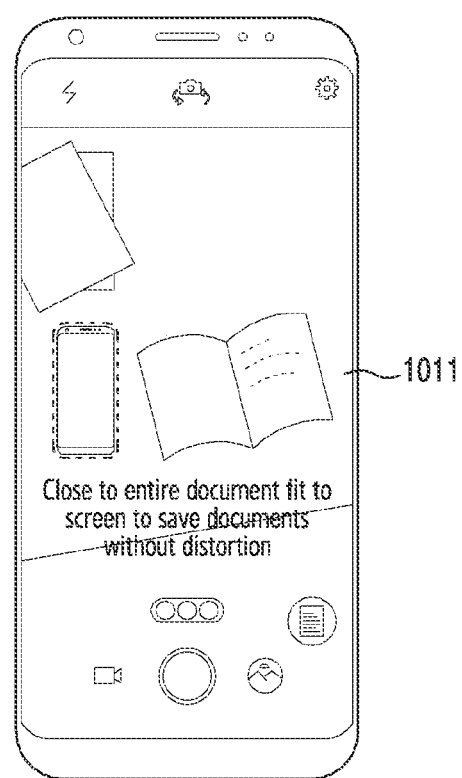
FIG. 10B is a diagram illustrating an example of a user interface including an error report message related to the size of a document, in an electronic device, according to an embodiment.
Figure 10C:
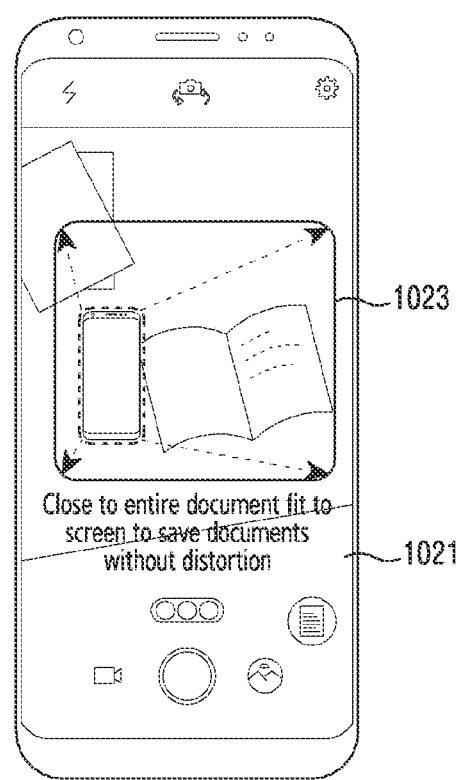
FIG. 10C is a diagram illustrating an example of a user interface including an error report message related to the size of a document, in an electronic device, according to an embodiment.
Figure 11A:
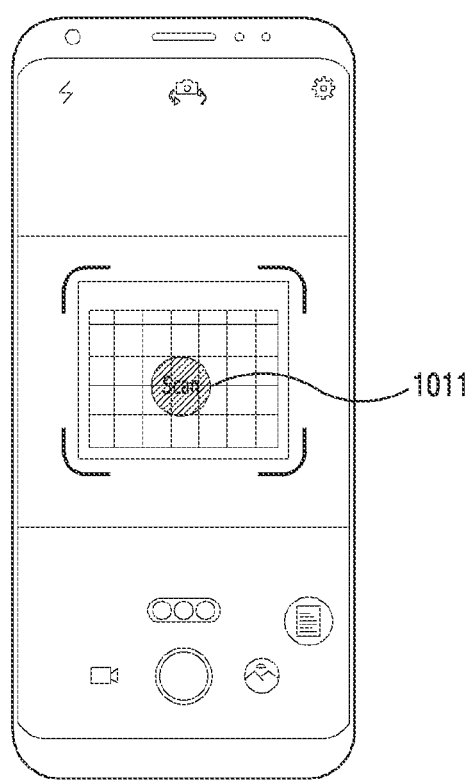
FIG. 11A is a diagram illustrating an example of a user interface provided based on the distortion level of a document in an electronic device, according to an embodiment.
Figure 11B:
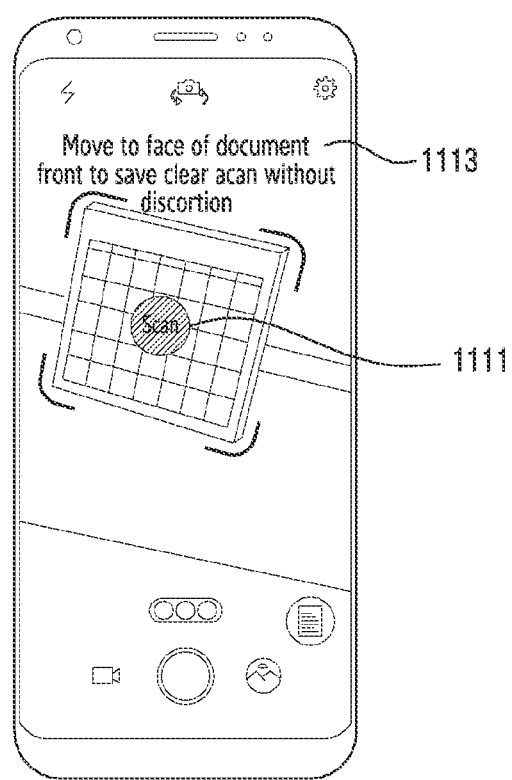
FIG. 11B is a diagram illustrating an example of a user interface provided based on the distortion level of a document in an electronic device, according to an embodiment.
Figure 11C:
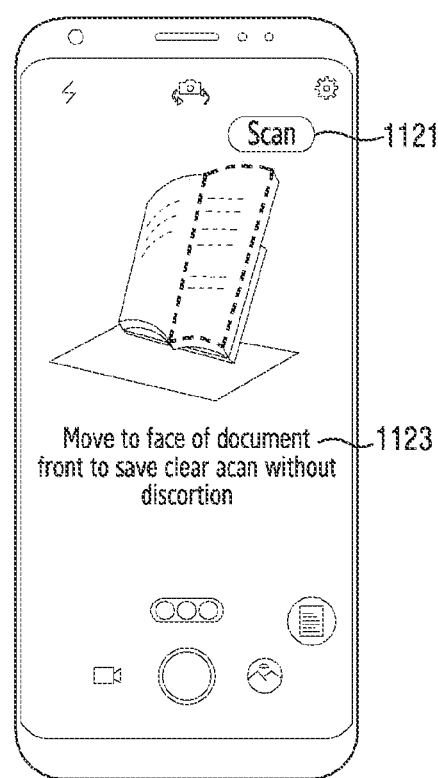
FIG. 11C is a diagram illustrating an example of a user interface provided based on the distortion level of a document in an electronic device, according to an embodiment.

FIG. 10A is a diagram illustrating an example of a user interface including an error report message related to the size of a document, by an electronic device, according to an embodiment. FIG. 10B is a diagram illustrating an example of a user interface including an error report message related to the size of a document, by an electronic device, according to an embodiment. FIG. 10C is a diagram illustrating an example of a user interface including an error report message related to the size of a document, by an electronic device, according to an embodiment. FIG. 11A is a diagram illustrating an example of a user interface provided based on the distortion level of a document by an electronic device, according to an embodiment. FIG. 11B is a diagram illustrating an example of a user interface provided based on the distortion level of a document by an electronic device, according to an embodiment. FIG. 11C is a diagram illustrating an example of a user interface provided based on the distortion level of a document by an electronic device, according to an embodiment.

Referring to flowchart 900 of FIG. 9, an electronic device (e.g., the processor 120 of FIG. 1) determines whether the size of a document is less than or equal to a predetermined maximum size, in step 901. For example, the processor 120 may determine whether the entirety of a document is included in an image or a part of the document is included in the image, based on the number of segments or vertices of the document, and determines whether the size of the document is less than or equal to the predetermined maximum size. If all of the four segments or the four vertices of the document are detected, the processor 120 determines that the entirety of the document is included in the image, and determines that the size of the document is less than or equal to the predetermined maximum size. If the four segments or four vertices are not detected (e.g., three or fewer segments or three or fewer vertices are detected), the processor 120 determines that a part of the document is included in the image, and determines that the size of the document is greater than the predetermined maximum size.

If the size of the document is greater than the predetermined maximum size, the electronic device (e.g., the processor 120) provides a third user interface including an error report message that requests decreasing the size of the document, in step 913. The error report message that requests decreasing the size of the document may be a message of requesting adjustment of the photography location and/or the subject distance for photography of a camera so that the entirety of the document is included in the image since the size of the document is greater than the predetermined maximum size.

For example, as illustrated in FIG. 10A, if only a part of a calendar is included in the image, the processor 120 provides a third user interface including an error report message 1001 which requests adjustment to enable the entirety of the calendar to be included in the image and to store the calendar without distortion. According to an embodiment, the third user interface may include at least some of graphic elements which are included in the third user interface, which have been described in step 705 of FIG. 7.

If the size of the document is less than or equal to the predetermined maximum size, the electronic device (e.g., the processor 120) determines whether the size of the document is greater than or equal to a predetermined minimum size, in step 903. According to an embodiment, if the entirety of the document is included in the image, the processor 120 may measure the size of the entire document, and may compare the measured size of the entire document and the predetermined minimum size.

If the size of the document is less than the predetermined minimum size, the electronic device (e.g., the processor 120) provides a third user interface including an error report message that requests increasing the size of the document, in step 915. The error report message that requests increasing the size of the document may be a message that requests adjustment of the distance to the document for photography to enable the size of the document to be increased since the size of the document is less than the predetermined minimum size.

For example, as illustrated in FIG. 10B, if a small memo, which is smaller than the predetermined minimum size, is included in the image, the processor 120 provides a third user interface including an error report message 1011, which requests adjusting the distance to the memo for photography to be closer so that the memory is stored without distortion. As another example, as illustrated in FIG. 10C, if a small memo, which is smaller than the predetermined minimum size, is included in the image, the processor 120 provides a third user interface including an error report message 1021 and a graphic element 1023. The error report message 1021 requests adjusting the distance to the memo for photography to be closer so that the memory is stored without distortion, and the graphic element 1023 indicates a recommended size and/or area associated with the memo. The third user interface may include at least some of graphic elements which are included in the third user interface, which has been described in step 715 of FIG. 7.

If the size of the document is less than or equal to the predetermined minimum size, the electronic device (e.g., the processor 120) determines whether a distortion level is greater than a first predetermined level, in step 905. The distortion level may be, for example, a degree of distortion of the document included in the image. According to an embodiment, the distortion level may be determined based on the angle of at least one of the four vertices of the document. The distortion level may be determined based on the four segments of the document, or the angle of at least two of the plurality of segments of the document. The first predetermined level may be a level at which a document is scanned and stored without performing an additional process related to distortion (e.g., compensation for distortion), or a level in which text included in a document is recognizable without compensation for distortion. The first predetermined level may be set and/or changed by a designer and/or a user. For example, the first predetermined level may be defined to include the case in which the angles of the four vertices of the document are all greater than or equal to a first threshold angle (e.g., 65 degrees). For example, if the angles of the four vertices of the document are all greater than or equal to the first threshold angle, the processor 120 may determine that the distortion level of the document is less than or equal to the first predetermined level. If the angle of at least one of the four vertices of the document is less than the first threshold angle, the processor 120 may determine that the distortion level of the document is greater than the first predetermined level. This is merely an example provided for ease of understanding, and embodiments are not limited thereto. For example, embodiments may determine the distortion level of the document using various methods known to those skilled in the art.

If the distortion level of the document is less than or equal to the first predetermined level, the electronic device (e.g., the processor 120) proceeds with step 707 of FIG. 7 and subsequent operations. For example, if the distortion level of the document is less than or equal to the first predetermined level, the processor 120 may perform at least one of steps 707, 709, 711, or 713 of FIG. 7, may determine a document-related function based on the type of document, and may provide a second user interface including at least one third graphic object for performing the document-related function. For example, as illustrated in FIG. 11A, if the distortion level of the document is less than or equal to the first predetermined level, the processor 120 may provide a second user interface including the scan button 1101.

If the distortion level of the document is greater than the first predetermined level, the electronic device (e.g., the processor 120) determines whether the distortion level is less than a second predetermined level, in step 907. The second predetermined level may be a level in which a document is scanned and stored after compensation for distortion of the document, or a level in which text included in the document is recognizable after compensation for distortion of the document. The second predetermined level may be set and/or changed by a designer and/or a user. For example, the second predetermined level may be set to a value greater than the first predetermined level. For example, the second predetermined level may be defined to include the case in which the angles of the four vertices of the document are all greater than a second threshold value (e.g., 45 degrees), and the angle of at least one of the vertices is less than the first threshold angle. For example, if the angles of the four vertices of the document are all greater than the second threshold value and the angle of at least one vertex is less than the first predetermined angle, it is determined that the distortion level of the document is less than or equal to the second predetermined level and greater than the first predetermined level. If the angle of at least one of the four vertices of the document is less than the second threshold angle, the processor 120 may determine that the distortion level of the document is greater than the second predetermined level.

If the distortion level of the document is less than the second predetermined level, and is greater than the first predetermined level, the electronic device (e.g., the processor 120) determines a document-related function based on the type of document, in step 909. The step of determining a document-related function based on the type of document may be the same as steps 707 and 709 of FIG. 7, or may be the same as steps 707 and 711 of FIG. 7.

The electronic device (e.g., the processor 120) provides a fourth user interface including at least one third graphic object for performing the determined document-related function and a distortion report message, in step 911. The fourth user interface may include at least one graphic element included in the second user interface, and may additionally include a distortion report message.

For example, as illustrated in FIG. 11B, if the distortion level of the document is less than the second predetermined level, and is greater than the first predetermined level, the processor 120 provides a fourth user interface including a scan button 1111 and a distortion report message 1113. The distortion report message may include a message indicating that a photographing direction and/or the orientation of the document needs to be changed in order to clearly scan the document without distortion. According to an embodiment, if a user input to a scan button is detected in the fourth user interface, the processor 120 may obtain the document in the image, may compensate for the distortion of the obtained document, and may store the document of which distortion is compensated.

If the distortion level of the document is greater than or equal to the second predetermined level, the electronic device (e.g., the processor 120) provides a third user interface including a distortion report message, in step 917. The distortion report message may include a message indicating that a photographing direction and/or the orientation of the document needs to be changed in order to clearly scan the document without distortion. According to an embodiment, the third user interface may include at least some of graphic elements which are included in the third user interface, which has been described in step 705 of FIG. 7. According to an embodiment, the third user interface may include a deactivated scan button.

For example, as illustrated in FIG. 11C, if the distortion level of the document is greater than the second predetermined level, the processor 120 provides a third user interface including a deactivated scan button 1121 and a distortion report message 1123.

According to various embodiments, a method of an electronic device includes determining whether a document is included in an image provided from a camera. When a document is not included in the image, a first user interface is provided including at least one first graphic object for photographing the image. When a document is included in the image, a second user interface is provided for providing a function related to the document. The second user interface includes the at least one first graphic object, a second graphic object indicating that a document exists in the image, and at least one third graphic object for performing the function related to a document.

The second graphic object may include at least one of a predetermined symbol indicating that a document exists in the image or a graphic effect indicating an area where a document is recognized in the image.

Providing the second user interface that provides the function related to the document may include, when a document is included in the image, determining whether the document is recognizable, based on whether the document satisfies a predetermined condition. When the document is recognizable, at least one function related to the document is determined based on a type of document or information included in the document.

The at least one function related to the document may include at least one of a function of scanning the document, a function of searching for additional information related to the document, a payment function based on information included in the document, a web access function based on information included in the document, a schedule add function based on information included in the document, and a function of adding contact information based on information included in the document.

The second user interface may include a third graphic object that provides a function of scanning the document, and the method may further include, when a user input to the third graphic object, which provides the function of scanning the document, is detected in the state in which the second user interface is provided, extracting and storing only the document from the image. When a user input to the first graphic object is detected in the state in which the second user interface is provided, the image including the document is photographed and stored.

Determining whether the document is recognizable may include determining whether at least one of a size of the document or a distortion level of the document satisfies the predetermined condition.

The method may further include providing, by the processor, a third user interface including an error report message related to at least one of a size of the document or a distortion level of the document, when the document is not recognizable. The third user interface may further include at least one of the at least one first graphic object and the second graphic object indicating that a document exists in the image.

The third user interface may further include at least one third graphic object for performing a function related to the document, and the at least one third graphic object is in a deactivated state.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A portable communication device comprising:
   a camera;
   a touchscreen display;
   a memory storing a camera application; and
   at least one processor configured to:
   display a user interface of the camera application, wherein the user interface comprises a preview image corresponding to an image being obtained via the camera;
   while the preview image is displayed in the user interface, determine an area of the preview image in which a text is included; and
   while the preview image is displayed in the user interface, display, in the user interface, a first graphical object for executing a function related to the text and a second graphical object including a graphical effect indicating the area in the user interface of the preview image in which the text is included.

2. The portable communication device of claim 1, wherein, while the preview image is displayed in the user interface, the at least one processor is configured to:
   determine that the text included in the area corresponds to a phone number; and
   based at least in part on a determination that the text in the area corresponds to the phone number, provide, via the user interface of the camera application, a contact add function to register contact information corresponding to the phone number to the portable communication device.

3. The portable communication device of claim 1, wherein, while the preview image is displayed in the user interface, the at least one processor is configured to:
determine that the text included in the area corresponds to schedule information, and
based at least in part on determination that the text in the area corresponds to the schedule information, provide, via the user interface of the camera application, a schedule add function to register schedule information to the portable communication device.

4. The portable communication device of claim 1, wherein the at least one processor is further configured to:
receive a user input with respect to the first graphical object; and
based at least in part on the first graphical object, perform the function related to the text.

5. The portable communication device of claim 1, wherein the at least one processor is further configured to display a captured image of the area of the preview image in which the text is recognized on the preview image, based on a determination that the text is recognized from the preview image.

6. The portable communication device of claim 1, wherein the at least one processor is further configured to:
determine that the text in the area includes a specified type of information; and
display, via the user interface, a second graphical object to perform another function corresponding to the specified type of information.

7. The portable communication device of claim 6, wherein the at least one processor is further configured to:
based at least in part on a determination that the specified type of information corresponds to web address information, provide a web access function to access a webpage corresponding to the web address information, as at least part of the other function.

8. The portable communication device of claim 6, wherein the at least one processor is further configured to:
based at least in part on a determination that the specified type of information corresponds to contact information, provide a call function to make a call based on the contact information.

9. The portable communication device of claim 6, wherein the at least one processor is further configured to:
based at least in part on a determination that the specified type of information corresponds to contact information, provide contact add function to register the contact information to the portable communication device, as at least part of the other function.

10. The portable communication device of claim 1, wherein the user interface further comprises a third graphical object configured to receive a user input to capture a photographing image.

11. The portable communication device of claim 10, wherein the at least one processor is further configured to:
based at least in part on the user input on the third graphical object, capture the photographing image using the camera.

12. A method of operating a portable communication device, the method comprising:
displaying a user interface of a camera application, wherein the user interface comprises a preview image corresponding to an image being obtained via the camera;
while the preview image is in the user interface, determining an area of the preview image in which a text is recognized; and
displaying, in the user interface, a first graphical object for executing a function related to the text and a second graphical object including a graphical object including a graphic effect indicating the area in the user interface of the preview image in which the text is recognized.

13. The method of claim 12, further comprising:
determining whether the text indicates schedule information, and
at least in part on determining that the text indicates the schedule information, determining that the function comprises a schedule adding function.

14. The method of claim 12, further comprising:
receiving a user input with respect to the first graphical object; and
based at least in part on receiving the user input with respect to the first graphical object, perform the function related to the text.

15. The method of claim 12, further comprising:
displaying a captured image of the area of the preview image in which the text is recognized on the preview image, based on a determination that the text is recognized from the preview image.

16. The method of claim 12, further comprising:
determining that the text in the area includes a specified type of information; and
displaying, via the user interface, a second graphical object to perform another function corresponding to the specified type of information.

17. The method of claim 16, further comprising:
based at least in part on a determination that the specified type of information corresponds to web address information, providing a web access function to access a webpage corresponding to the web address information, as at least part of the other function.

18. The method of claim 16, further comprising:
based at least in part on a determination that the specified type of information corresponds to contact information, providing a call function to make a call based on the contact information.

19. The method of claim 16, further comprising:
based at least in part on a determination that the specified type of information corresponds to contact information, providing contact add function to register the contact information to the portable communication device, as at least part of the other function.

20. The method of claim 12, wherein the user interface further comprises a third graphical object configured to receive a user input to capture a photographing image.

21. The portable communication device of claim 1, wherein the graphical effect includes a plurality of subareas each substantially corresponding to a corner portion of the determined area.

22. The portable communication device of claim 21, wherein the graphical effect includes a first graphical item indicative of a first subarea substantially corresponding to a first corner of the area, and a second graphical item indicative of a second subarea substantially corresponding to a second corner of the area substantially diagonal to the first corner.

23. A portable communication device comprising:
a camera;
a touchscreen display;
a memory storing a camera application; and
at least one processor configured to:
  display a user interface of the camera application, wherein the user interface comprises a preview image corresponding to an image being obtained via the camera;
  while the preview image is displayed in the user interface, determine an area of the preview image in which a text is included;
  while the preview image is displayed in the user interface, display, in the user interface, a first graphical object for indicating that text exists in the preview image and a second graphical object indicating the area in the user interface of the preview image in which the text is included; and
  display, in the user interface, a first graphical user interface button configured to receive a first user input for executing a first function related to the text, and a second graphical user interface button configured to receive a second user input for executing a second function related to the text.

24. The portable communication device of claim 23, wherein the first graphical object is a symbol displayed at the bottom right of the preview image.

25. The portable communication device of claim 23, wherein the second graphical object includes a first graphical item indicative of a first subarea substantially corresponding to a first corner of the area, and a second graphical item indicative of a second subarea substantially corresponding to a second corner of the area substantially diagonal to the first corner.

26. The portable communication device of claim 23, wherein the first graphical user interface button is for a scan function related to the text.

27. The portable communication device of claim 23, wherein the second graphical user interface button is for a schedule add function to register schedule information including time information or place information obtained from the text to a schedule application or a calendar application of the portable communication device.

28. The portable communication device of claim 23, wherein the second graphical user interface button is for a contact information add function to register contact information obtained from the text to the portable communication device.

29. The portable communication device of claim 23, wherein the second graphical user interface button is for a search function to search an additional information related to the text.

30. A method of operating a portable communication device, the method comprising:
  displaying a user interface of a camera application, wherein the user interface comprises a preview image corresponding to an image being obtained via a camera of the portable communication device;
  while the preview image is displayed in the user interface, determining an area of the preview image in which a text is included;
  while the preview image is displayed in the user interface, displaying, in the user interface, a first graphical object for indicating that text exists in the preview image and a second graphical object indicating the area in the user interface of the preview image in which the text is included; and
  display, in the user interface, a first graphical user interface button configured to receive a first user input for executing a first function related to the text, and a second graphical user interface button configured to receive a second user input for executing a second function related to the text.

31. The method of claim 30, wherein the first graphical object is a symbol displayed at the bottom of the preview image.

32. The method of claim 30, wherein the second graphical object includes a first graphical item indicative of a first subarea substantially corresponding to a first corner of the area, and a second graphical item indicative of a second subarea substantially corresponding to a second corner of the area substantially diagonal to the first corner.

33. The method of claim 30, wherein the first graphical user interface button is for scan function related to the text.

34. The method of claim 30, wherein the second graphical user interface button includes at least one of:
  a function button for adding a schedule information from including time information and/or place information obtained from the text to a calendar application or a schedule application of the portable communication device;
  a function button for adding a contact information obtained from the text to the portable communication device; and
  a function button for searching additional information related to the text.

35. A non-transitory computer-readable recording medium storing a program to implement operations, the operations comprising:
  displaying a user interface of a camera application, wherein the user interface comprises a preview image corresponding to an image being obtained via a camera;
  while the preview image is displayed in the user interface, determining an area of the preview image in which a text is included;
  while the preview image is displayed in the user interface, displaying, in the user interface, a first graphical object for indicating that text exists in the preview image and a second graphical object indicating the area in the user interface of the preview image in which the text is included; and
  displaying, in the user interface, a first graphical user interface button configured to receive a first user input for executing a first function related to the text, and a second graphical user interface button configured to receive a second user input for executing a second function related to the text.

36. The non-transitory computer-readable recording medium of claim 35, wherein the first graphical object is a symbol displayed at the bottom right of the preview image.

37. The non-transitory computer-readable recording medium of claim 35, wherein the second graphical object includes a first graphical item indicative of a first subarea substantially corresponding to a first corner of the area, and a second graphical item indicative of a second subarea substantially corresponding to a second corner of the area substantially diagonal to the first corner.

38. The non-transitory computer-readable recording medium of claim 35, wherein the first graphical user interface button is for scan function related to the text.

39. The non-transitory computer-readable recording medium of claim 35, wherein the second graphical user interface button includes at least one of:

a function button for adding a schedule information from including time information and/or place information obtained from the text to a calendar application or a schedule application of the portable communication device;

a function button for adding a contact information obtained from the text to the portable communication device; and a function button for searching additional information related to the text.

* * * * *